Patented Sept. 4, 1951

2,567,154

UNITED STATES PATENT OFFICE 2,567,154

TETRA-ALKYLMONOTHIONOPYROPHOSPHATE AND PROCESS OF PREPARATION

Gennady M. Kosolapoff, Dayton, Ohio, assignor to Monsanto Chemical Company, St. Louis, Mo., a corporation of Delaware No Drawing. Application June 26, 1948, Serial No. 35,512

9 Claims. (Cl. 260—461)

This invention provides a new method for producing tetraalkyl monothionopyrophosphates. It also provides a process for producing mixed tetraalkyl monothionopyrophosphates. The present esters are useful as insecticides, oil additives and for other purposes.

Tetraethyl monothionopyrophosphate was first prepared by Arbuzov (Journal General Chemistry USSR, 2, 348 (1932)) by an involved reaction sequence yielding the above product in an overall yield of only about 10% of the theory.

I have now discovered that tetraalkyl monothionopyrophosphates may be readily prepared in at least a 35% to 40% or higher yields by the interaction of dialkyl phosphoryl chloride and dialkyl sodium thiophosphate. The reaction which takes place may be illustrated by the following equation:

$(RO)_2POCl + NaOPS(OR)_2 \longrightarrow$

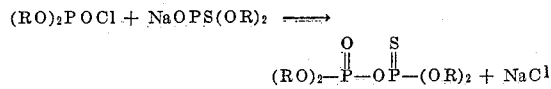

$(RO)_2-\overset{O}{\underset{\|}{P}}-O\overset{S}{\underset{\|}{P}}-(OR)_2 + NaCl$ where R represents any primary or secondary group of from 1 to 18 carbon atoms.

The above reaction involves a condensation of dialkyl phosphoryl chloride and a dialkyl sodium thiophosphate in which condensation reaction, sodium chloride is formed and liberated. The preferred proportions of the reactants are those indicated by the above equation; however, the reaction occurs as indicated irrespective of the precise amounts of the reactants supplied to the initial mixture.

The reaction above described may be carried out either in the absence or in the presence of an inert solvent. The use of a solvent is generally advisable since by its use a somewhat larger yield of product is obtained. Almost any inert hydrocarbon such as benzene, toluene, xylene, petroleum hydrocarbons, monochlorobenzene, or mixtures thereof may be employed as the solvent.

The temperature of reaction may range from room temperature up to temperatures of 100° C. When it is desired to use temperatures above the boiling point of the solvent, where the same is employed, the reaction may be carried out under pressure.

The process is illustrated by the following examples:

Example 1

0.5 gram mole of diethyl phosphoryl chloride was mixed with 0.5 gram mole of diethyl sodium thiophosphate in benzene solution. After standing overnight, the precipitated NaCl was removed by filtration and distillation of the filtrate gave a 38% yield of tetraethyl monothionopyrophosphate, B. P. 110° C. at 0.5 mm. The diethyl sodium thiophosphate employed in the above reaction may be prepared according to the process referred to in Chemical Abstracts 41, 1599 (1947). This reaction may also be employed for producing the dialkyl sodium thiophosphates employed in the following examples.

The product as produced by the above process may be purified and recovered by vacuum distillation and as so obtained may be employed for insecticidal purposes, as described in my copending application Serial No. 35,511, filed of even date herewith. In many cases, however, it may not be necessary to purify the product by distillation, as indicated above. Moreover, since the sodium chloride formed as a by-product in the above condensation reaction is generally inert with respect to vegetation upon which the insecticide may be used, the presence of such sodium chloride is not objectionable and therefore this material may be permitted to remain in the reaction product and the product of reaction employed as described in the above-mentioned copending application.

Example 2

0.5 gram mole of di-(n-propyl) phosphoryl chloride is mixed with 0.5 gram mole of diethyl sodium thiophosphate in benzene solution. The precipitated NaCl which separates during the reaction is removed by filtration and a product containing dipropyl diethyl monothionopyrophosphate obtained. Di-(isopropyl) phosphoryl chloride may be substituted for the n-propyl phosphoryl chloride employed in this example.

Example 3

1.0 gram moles of diisopropyl phosphoryl chloride is mixed with one gram mole of diisopropyl sodium thiophosphate in xylene solution. After standing several hours the sodium chloride which separates is removed and the product purified by distillation. A good yield of tetra-(isopropyl) monothionopyrophosphate is obtained.

Example 4

One gram mole of dihexyl phosphoryl chloride is mixed with one gram mole of dihexyl sodium thiophosphate in xylene solution. After agitation and standing for 24 hours, sodium chloride is removed by filtration, after which the xylene present is distilled. The product consists of tetrahexyl monothionopyrophosphate.

Example 5

One gram mole of dilauryl phosphoryl chloride is mixed with one gram mole of dilauryl sodium thiophosphate in xylene solution. Sodium chloride is removed by filtration and the xylene then removed by distillation. The product consisting of tetralauryl monothionopyrophosphate is obtained as a residue. This product may be employed as an oil additive.

Example 6

One gram mole of dioctadecyl phosphoryl chloride is mixed with one gram mole of dioctadecyl sodium thiophosphate in toluene solution. The sodium chloride formed is removed by filtration and the toluene then separated by distillation under a reduced pressure. The residue consists of tetraoctadecyl monothionopyrophosphate.

The reaction is susceptible to considerable variation in a wide variety of products which may be produced. As indicated above, any dialkyl phosphoryl chloride may be reacted with any dialkyl sodium thiophosphate by means of the present condensation reaction. As will be obvious, the alkyl groups in the dialkyl phosphoryl chloride may be the same or different from the alkyl groups present in the dialkyl sodium thiophosphate.

The present application is a continuation-in-part of my application Serial No. 785,515, filed November 12, 1947, now abandoned.

Since it is obvious that various changes and modifications may be made in the invention above set forth without departing from the spirit thereof, this invention is not restricted to the specific details described herein except as defined in the appended claims.

What I claim is:

1. The process which comprises condensing a dialkyl phosphoryl chloride and a dialkyl sodium thiophosphate, whereby sodium chloride is liberated during the reaction.
2. The process which comprises condensing in an inert solvent a dialkyl phosphoryl chloride and a dialkyl sodium thiophosphate, whereby sodium chloride is liberated by the condensation.
3. The process which comprises condensing a dialkyl phosphoryl chloride with a substantially equimolecular proportion of dialkyl sodium thiophosphate in an inert solvent, whereby sodium chloride is liberated by the condensation.
4. The process which comprises reacting together diethyl phosphoryl chloride and diethyl sodium thiophosphate and recovering tetraethyl monothionopyrophosphate from the reaction product.
5. Process which comprises reacting together diethyl phosphoryl chloride and diethyl sodium thiophosphate and separating sodium chloride from the reaction product.
6. The process which comprises condensing substantially equal molecular proportions of dialkyl phosphoryl chloride and a dialkyl sodium thiophosphate, whereby sodium chloride is liberated and a tetraalkyl monothionopyrophosphate is produced.
7. The process which comprises condensing at a temperature below 100° C. substantially equal molecular proportions of dialkyl phosphoryl chloride and a dialkyl sodium thiophosphate, whereby a tetraalkyl monothionopyrophosphate is produced.
8. The process which comprises condensing dipropyl phosphoryl chloride and diethyl sodium thiophosphate, whereby sodium chloride is liberate.
9. The compound represented by the formula:

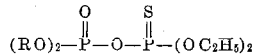

where R is the propyl radical.

GENNADY M. KOSOLAPOFF.

REFERENCES CITED

The following references are of record in the file of this patent:

UNITED STATES PATENTS

| Number | Name | Date |
|---|---|---|
| 2,197,462 | Bent | Apr. 16, 1940 |

OTHER REFERENCES

Arbusow et al.: "Ber. deutsch. chem. Ges.," vol. 65 (1932), pp. 196 and 198.

Arbusow et al.: "Jour. prakt. Chem.," vol. 130 (1931), page 128.